(12) United States Patent
Kuo

(10) Patent No.: US 9,409,308 B2
(45) Date of Patent: Aug. 9, 2016

(54) DEVICE FOR SEPARATING EJECTION WORKPIECES

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 583 days.

(21) Appl. No.: 13/864,234

(22) Filed: Apr. 16, 2013

(65) Prior Publication Data

US 2014/0091126 A1    Apr. 3, 2014

(30) Foreign Application Priority Data

Sep. 28, 2012    (TW) .............................. 101135870 A

(51) Int. Cl.
  *B26F 3/02*    (2006.01)
  *B29C 45/38*    (2006.01)

(52) U.S. Cl.
  CPC . *B26F 3/02* (2013.01); *B29C 45/38* (2013.01); *Y10T 225/364* (2015.04); *Y10T 225/371* (2015.04)

(58) Field of Classification Search
  CPC .. B29C 45/38; B29C 45/382; Y10T 225/364; Y10T 225/386; Y10T 225/35; Y10T 225/393; Y10T 225/30; B26F 3/00

USPC ......... 29/426.4, 426.5; 83/199, 200; 264/339, 264/334, 161; 225/93; 425/436 RM, 554; 429/66.1, 68

See application file for complete search history.

(56) References Cited

U.S. PATENT DOCUMENTS 8,376,342 B2 *   2/2013   Lee .......................... B25B 11/02
                                                                 24/489

FOREIGN PATENT DOCUMENTS

JP            57210838 A  * 12/1982  ............ B29C 45/382

OTHER PUBLICATIONS

Translation of JP19821224; Kinshiro Imai, Japan.*

* cited by examiner

*Primary Examiner* — Laura M Lee
(74) *Attorney, Agent, or Firm* — ScienBiziP, P.C.

(57) ABSTRACT

A device is used for separating an ejection workpiece from a stub bar, and includes a fixing element, a clamp, and a mechanism arm. The fixing element fixes the stub bar. The clamp clamps the ejection workpiece. The mechanism arm connects the clamp and actuates the clamp to clamp the ejection workpiece and then rotates the clamp relative to the stub bar, such that the ejection workpiece is separated from the stub bar.

12 Claims, 3 Drawing Sheets

DEVICE FOR SEPARATING EJECTION WORKPIECES

BACKGROUND

1. Technical Field

The present disclosure relates to a device for separating ejection workpieces.

2. Description of Related Art

Currently, in an ejection molding process, ejection workpieces are separated from stub bars by an automatic cutting machine. However, the automatic cutting machine is very expensive, thus increasing the production cost.

Therefore, it is desirable to provide a device for separating ejection workpieces that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
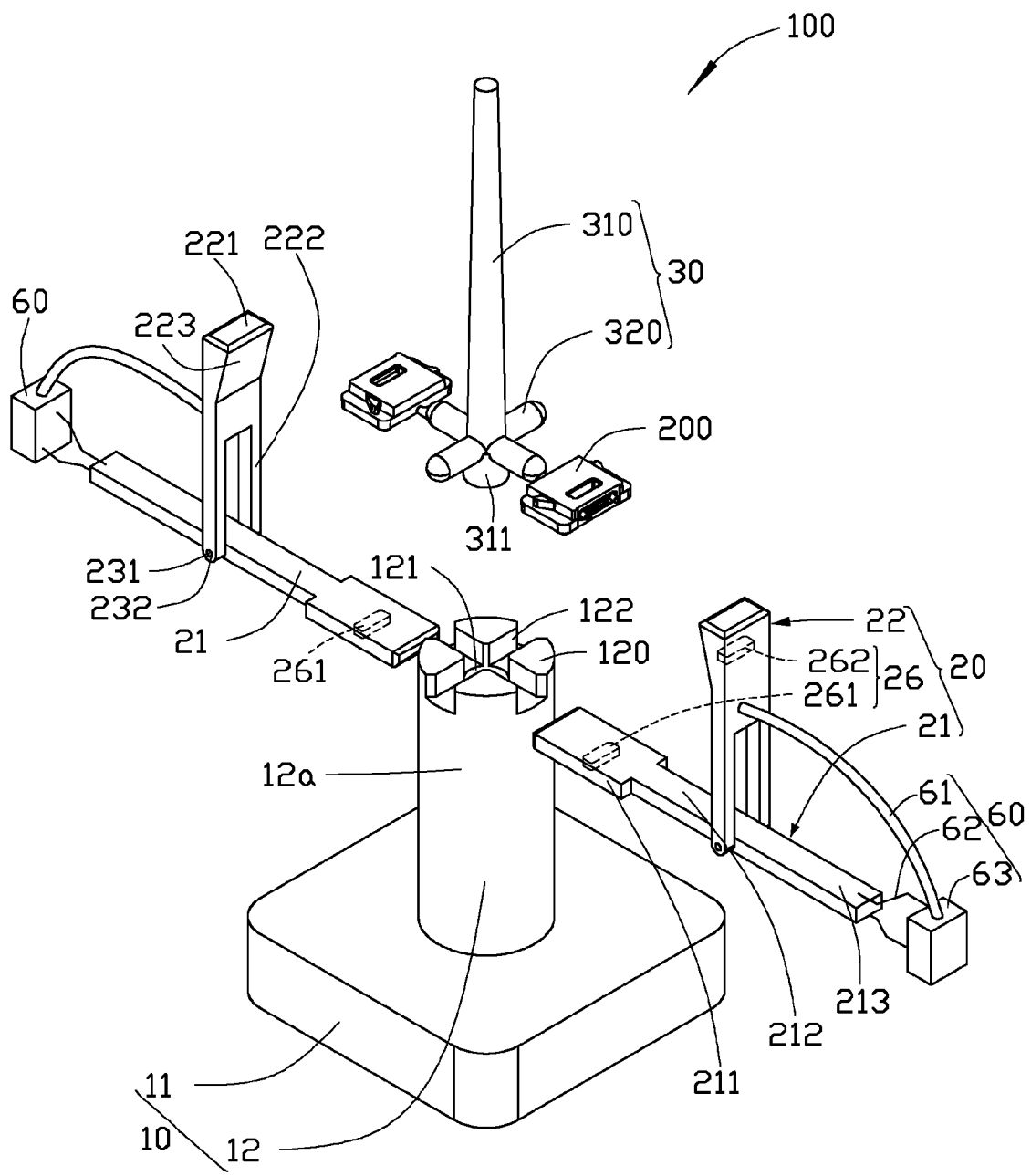
FIG. 1 is a schematic view of a device for separating ejection workpieces, according to an exemplary embodiment.
Figure 2:
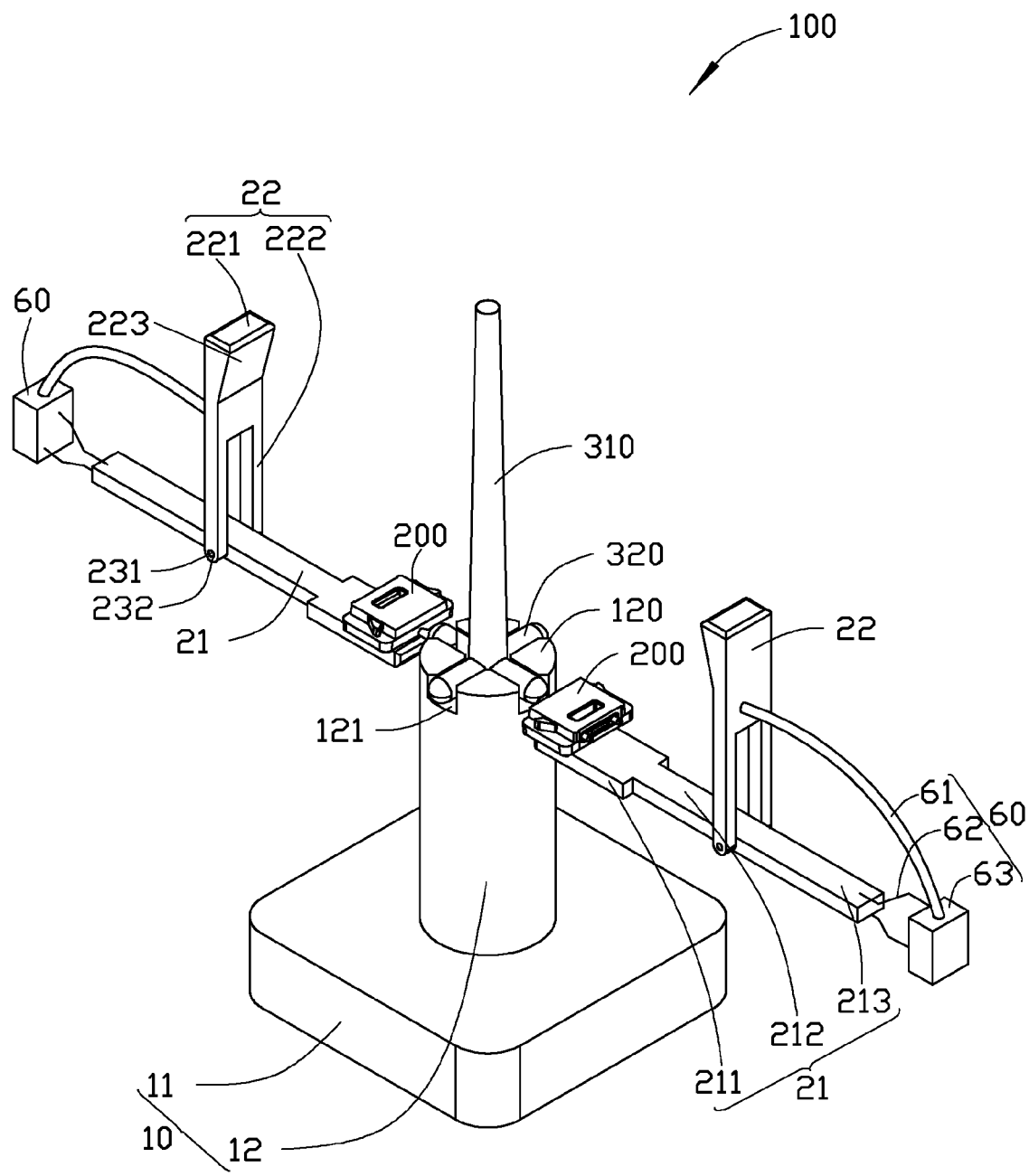
FIG. 2 is similar to FIG. 1, but showing the device in a working state.

FIG. 1 and FIG. 2 illustrate a device 100 for separating ejection workpieces 200 from a stub bar 30 in accordance with an embodiment. The stub bar 30 includes a sprue bar 310 and a number of runner bars 320 perpendicularly extending from the sprue bar 310.

The sprue bar 310 includes a fixing end 311. The runner bars 320 are positioned adjacent to the fixing end 311. The ejection workpieces 200 are connected to an end of each runner bar 320 away from the sprue bar 310. In the embodiment, the number of the runner bars 320 is four, and the runner bars 320 are cooperated to form a cross shape. The number of the ejection workpiece 200 is two, and the two ejection workpieces 200 are connected to two opposite runner bars 320. The number of the runner bars 320 and the number of the ejection workpieces 200 are not limited to the embodiment.

The separating device 100 includes a fixing element 10, two clamps 20, and two arm mechanisms 60. The number of clamps of the arm mechanisms 60 are not limited to the embodiment.

The fixing element 10 includes a cylindrical main body 12 and a substrate 11 for supporting the main body 12. The main body 12 includes a loading surface 120 away from the substrate 11. A central portion of the loading surface 120 defines a cylindrical receiving groove 121 extending along an axial direction of the main body 12. The receiving groove 121 is used for receiving the fixing end 311. The loading surface 120 further defines a number of slots 122 along the radial directions of the loading surface 120. The slots 122 are communicated with the receiving groove 121, and pass through an outer circumferential surface 12a of the main body 12. The slots 122 are used for receiving the runner bars 320. The length of each slot 122 is less than or substantially equal to the length of the runner bars 320, and thus the ejection workpieces 200 extend out of the corresponding slots 122. In the embodiment, the number of the slots 122 is four, and the four slots 122 cooperatively form a cross shape.

The two clamps 20 are used for separating the two ejection workpieces 200 from two of the runner bars 320. Each clamp 20 includes a first clamping plate 21, a second clamping plate 22, and a locking assembly 26. The first clamping plate 21 includes a first clamping portion 211, a first connecting portion 212 extending from the first clamping portion 211, and a handle 213 extending from the first connecting portion 212. The second clamping plate 22 includes a second clamping portion 221 and a second connecting portion 222 extending from the second clamping portion 221. The second clamping portion 221 includes a clamping surface 223 facing the first clamping portion 211. The clamping surface 223 is inclined relative to the second connecting portion 222, and an included angle formed between the clamping surface 223 and the second connecting portion 222 is an obtuse angle. The second connecting portion 222 is rotatably (such as pivotally) connected to the first connecting portion 211. The first clamping portion 211 and the second clamping portion 221 are cooperated to clamp one of the ejection workpieces 200. In the embodiment, the first connecting portion 212 has two pins 231 at one end, the second connecting portion 222 defines two pivot holes 232, and the pins 231 insert into the two pivot holes 232, and thus the second clamping plate 22 can rotate around the pins 231.

The locking assembly 26 is used for locking the first clamping portion 211 and the second clamping portion 221 together, and includes a first magnetic element 261 mounted in the first clamping portion 211, and a second magnetic element 262 mounted in the second clamping portion 221. The second magnetic element 262 spatially corresponds to the first magnetic element 261, and can attract the first magnetic element 261, and thus one of the ejection workpieces 200 is clamped between the first clamping portion 211 and the second clamping portion 221.

The two arm mechanisms 60 control the action of the two clamps 20. Each arm mechanism 60 includes a first actuating portion 61, a second actuating portion 62, and a controller 63. The first actuating portion 61 is connected to the second clamping portion 221, and is used for actuating the second clamping portion 221 to rotate towards or away from the first clamping portion 211, and thus the corresponding clamp 20 opens or closes. The second actuating portion 62 is connected to the handle 213 of the corresponding clamp 20 and is used for controlling the corresponding clamp 20 to move towards or far away from the fixing element 10, and controlling the corresponding clamp 20 to rotate when the ejection workpiece 200 is received in the corresponding clamp 20. Thus the ejection workpiece 200 is separated from the corresponding runner bar 230. The controller 63 is used for controlling the action of the first actuating portion 61 and the second actuating portion 62. The number of the arm mechanisms 60 is not limited to the embodiment.

In the embodiment, the first actuating portion 61 is a pole. One end of the pole is fixedly connected to the second clamping portion 221, the other end of the pole is movably connected to the controller 63, and thus the pole can be driven (i.e. pushed or pulled) by the controller 63 to move towards or away from the first clamping portion 211. The second actuating portion 62 includes two resilient plates for clamping the handle 213, and a rotating element capable of rotating. The two resilient plates are fixed to the rotating element, and thus can rotate with the rotating element. The controller 63 includes a step motor, a rotary motor, and a microcomputer.

The step motor drives the pole to move, the rotary motor drives the rotating element to rotate, and the microcomputer controls the movements of the step motor and the rotary motor.

Figure 3:
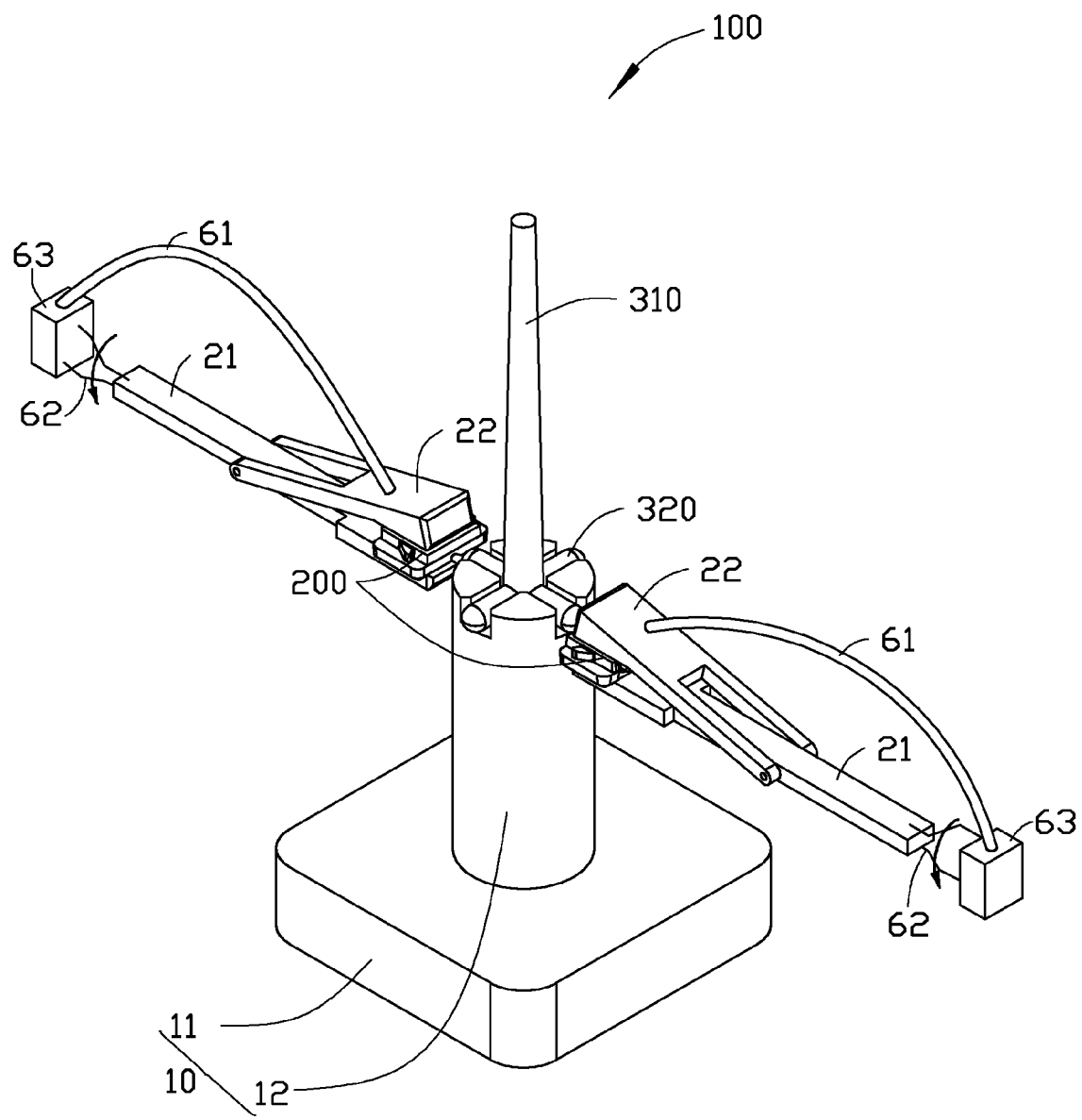
FIG. 3 is similar to FIG. 2, but showing the device in another working state.

Referring to FIG. 3, in use, the fixing end 311 is received in the receiving groove 121, the runner bars 320 are received in the slots 122, and the first actuating portion 61 actuates the second clamping portion 221 to move away from the first clamping portion 211 to open the corresponding clamp 20. The second actuating portion 62 actuates the corresponding clamp 20 to move towards the fixing element 10 until the corresponding ejection workpiece 200 is positioned on the first clamping portion 211, then the first actuating portion 61 actuates the second clamping portion 62 to move towards the first clamping portion 211 to close the corresponding clamp 20. The first magnetic element 261 and the second magnetic element 262 are cooperated to lock the first clamping element 211 and the second clamping element 221 together. Lastly, the controller 63 controls the two second actuating portions 62 to rotate to separate the ejection workpieces 200 from the corresponding runner bars 320.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A device for separating an ejection workpiece from a stub bar, comprising:
a fixing element for fixing the stub bar,
a clamp for clamping the ejection workpiece, and
an arm mechanism connected to the clamp and configured to actuate the clamp to clamp the ejection workpiece and then rotate the clamp relative to the stub bar, so as to separate the ejection workpiece from the stub bar;
wherein the clamp comprises a first clamping plate, a second clamping plate rotatably connected to the first clamping plate, and a locking assembly for locking the first clamping plate and the second clamping plate together when the ejection workpiece is clamped between the first clamping plate and the second clamping plate;
the first clamping plate comprises a first clamping portion and a first connecting portion extending from the first clamping portion, the second clamping plate comprises a second clamping portion and a second connecting portion extending from the second clamping portion, the second connecting portion is rotatably connected to the first connecting portion, and the first clamping portion and the second clamping portion cooperate to clamp the ejection workpiece therebetween;
the first clamping plate comprises a handle extending from the first connecting portion and away from the first clamping portion, the arm mechanism comprises a first actuating portion, a second actuating portion, and a controller, the first actuating portion is configured for controlling the clamp to open or to close, the second actuating portion is connected to the handle, thus to hold the clamp, the second actuating portion is configured for rotating the clamp relative to the stub bar, and the controller is configured for controlling the action of the first actuating portion and the second actuating portion;
the second connecting portion is capable of rotating with respective to the first connecting portion in a first rotation direction, the second actuating portion is configured for rotating the clamp relative to the stub bar in a second rotation direction, and the first rotation direction is different from the second rotation direction, the first rotation direction and the second rotation direction are in two different planes perpendicular to each other.

2. The device of claim 1, wherein the first clamping portion is adjacent to the fixing element relative to the first connecting portion, and the second clamping portion is adjacent to the fixing element relative to the second connecting portion.

3. The device of claim 1, wherein the second clamping portion has a clamping surface facing the first clamping portion, the clamping surface is inclined relative to the second connecting portion, and an included angle between the clamping surface and the second connecting portion is an obtuse angle.

4. The device of claim 1, wherein the first clamping portion is rotatably connected to the second clamping portion, the first connecting portion comprises two pins at one end, the second connecting portion defines two pivot holes, the pins are inserted into the two pivot holes, and thus the second clamping plate is capable of rotating with respective to the first connecting portion around the pivot holes.

5. The device of claim 1, wherein the locking assembly comprises a first magnetic element mounted on the first clamping portion and a second magnetic element mounted on the second clamping portion, the second magnetic element attaches the first magnetic element when the first clamping portion and the second clamping portion cooperate to clamp the ejection workpiece therebetween.

6. The device of claim 1, wherein the first actuating portion is fixedly connected to the second clamping plate, and is configured for driving the second clamping plate towards or far away from the first clamping plate, thus to control the clamp to open or close.

7. The device of claim 1, wherein the second actuating portion is further configured for driving the clamp to move towards or far away from the fixing element.

8. The device of claim 1, wherein the ejection workpiece is extending from the stub bar in an extension direction, and the arm mechanism is configured to rotate the clamp relative to the stub bar in a rotation direction in a plane intersecting with the extension direction, so as to separate the ejection workpiece from the stub bar.

9. The device of claim 8, wherein the arm mechanism is configured to rotate the clamp relative to the stub bar in the rotation direction in the plane perpendicular to the extension direction.

10. The device of claim 1, wherein the stub bar comprises a sprue bar and a runner bar extending from the sprue bar, the runner bar comprises a fixing end, the ejection workpiece is fixed to an end of the runner bar away from the sprue bar, the fixing element comprises a main body, the main body comprises a loading surface, the loading surface defines a receiving groove for receiving the fixing end, the loading surface further defines a slot communicating with the receiving groove and passing through an outer circumferential surface of the main body, the slot is used for receiving the runner bar, a length of the slot is less than or substantially equal to a length of the runner bar.

11. The device of claim 10, wherein the fixing element comprises a substrate supporting the main body, and the loading surface is positioned away from the substrate.

12. The device of claim 10, wherein the main body is cylindrical, and the slot extends along a radius direction of the loading surface.

* * * * *